(12) United States Patent
Johnston

(10) Patent No.: US 11,306,831 B2
(45) Date of Patent: Apr. 19, 2022

(54) RELEVANT TO TAPS AND HANDLES AND THEIR OPERATION

(71) Applicants: RAMTAPS PTY LTD, Eagle Farm (AU); ROGERS SELLER & MYHILL PTY LTD, Burnley (AU)

(72) Inventor: Nicholas Johnston, Burnley (AU)

(73) Assignees: RAMTAPS PTY LTD, Eagle Farm (AU); ROGERS SELLER & MYHILL PTY LTD, Burnley (AU)

( * ) Notice: Subject to any disclaimer, the term of this patent is extended or adjusted under 35 U.S.C. 154(b) by 0 days.

(21) Appl. No.: 16/300,334

(22) PCT Filed: May 11, 2017

(86) PCT No.: PCT/AU2017/050428
§ 371 (c)(1),
(2) Date: Nov. 9, 2018

(87) PCT Pub. No.: WO2017/193167
PCT Pub. Date: Nov. 16, 2017

(65) Prior Publication Data
US 2019/0186643 A1    Jun. 20, 2019

(30) Foreign Application Priority Data

May 12, 2016    (AU) ................................ 2016901771

(51) Int. Cl.
*F16K 11/074*    (2006.01)
*F16K 31/60*    (2006.01)
*E03C 1/04*    (2006.01)

(52) U.S. Cl.
CPC ........ *F16K 11/0743* (2013.01); *E03C 1/0412* (2013.01); *F16K 31/605* (2013.01); *Y10T 137/9464* (2015.04)

(58) Field of Classification Search
USPC ........................................................ 137/801
See application file for complete search history.

(56) References Cited

U.S. PATENT DOCUMENTS 601,718 A    4/1898    Soderlund
982,498 A    1/1911    Hoffmann
(Continued)

FOREIGN PATENT DOCUMENTS

WO    WO-2015136481 A1 *    9/2015    ........... E03C 1/0412

OTHER PUBLICATIONS

International Search Report dated Aug. 3, 2017, for corresponding International Patent Application PCT/AU2017/050428 filed on May 11, 2017.
(Continued)

*Primary Examiner* — Daphne M Barry
(74) *Attorney, Agent, or Firm* — David D. Brush; Westman, Champlin & Koehler, P.A.

(57) ABSTRACT

A tap assembly includes a flow control mechanism, a spindle which rotates about its principal axis to operate the flow control mechanism, and a handle connectable to the spindle. The location on the handle where the spindle connects coincides with the spindle's principal axis but does not with the centroid of the handle's planform shape. When the handle is turned by a user, the handle rotates about the spindle's principal axis. The handle also moves or translates relative the spindle's principal axis. When the handle is in an initial "fully off" position, there is an area that is obscured from a user's view by the handle, but when the handle is initially turned from the initial position towards a final "fully on" position, the area begins to be revealed, and with further rotation of the handle towards the final position, more of, or different parts of, the area become revealed.

14 Claims, 4 Drawing Sheets

(56) References Cited

U.S. PATENT DOCUMENTS

| | | | |
|---|---|---|---|
| 1,024,175 A | | 4/1912 | Boye |
| 1,160,484 A | | 11/1915 | Wright |
| 1,165,940 A | * | 12/1915 | Busch .................... E03C 1/0404 285/181 |
| 2,679,864 A | * | 6/1954 | Harke ..................... F16K 11/18 137/635 |
| 5,320,137 A | | 6/1994 | Huang |
| 6,802,335 B2 | * | 10/2004 | Jones ........................ E03C 1/04 137/315.15 |
| 2009/0065079 A1 | | 3/2009 | Chung |
| 2011/0100478 A1 | * | 5/2011 | Allen .................... F16K 31/602 137/315.01 |
| 2014/0251071 A1 | * | 9/2014 | Ben-Dor .................. G05G 1/04 74/523 |
| 2014/0359935 A1 | | 12/2014 | Veros et al. |

OTHER PUBLICATIONS

Written Opinion of the International Searching Authority dated Aug. 3, 2017, for corresponding International Patent Application PCT/AU2017/050428 filed on May 11, 2017.

* cited by examiner

RELEVANT TO TAPS AND HANDLES AND THEIR OPERATION

CROSS-REFERENCE TO RELATED APPLICATIONS

The present application is a Section 371 National Stage Application of International Application No. PCT/AU2017/050428, filed May 11, 2017, which is incorporated by reference in its entirety and published as WO 2017/193167 A1 on Nov. 16, 2017, in English.

TECHNICAL FIELD

The present invention will be explained mainly with reference to its application to water taps, and in particular (although not necessarily exclusively) progressive mixer taps. However, application of the invention may also be possible to turnable handles, knobs and the like used to operate or control devices other than water taps.

BACKGROUND

A water tap is a device by which the flow of liquid from a pipe or container (e.g. the flow of water from a tap spout, or from a bath spout, or from a showerhead, or the like) can be controlled. Simple taps used for controlling the flow of water from tap spouts, bath spout, showerheads, etc, are ubiquitous and do not require explanation.

A mixer tap is a type of water tap which is connected to, and which receives water from, both a hot water supply/pipe and a cold water supply/pipe. Many mixer taps operate in such a way that, not only can the user control the rate of flow of the water exiting the water spout or other water outlet (i.e. not only can the user control how much, or how little, the tap is "turned on"), but the user can also, with one and the same tap, control the relative proportions of hot and cold water that mix prior to exiting the spout or outlet, such that the temperature of the water flowing from the spout/outlet can also be controllably varied (anywhere between the temperature of the cold water supply ("full cold") and that of the hot water supply ("full hot")).

In one common type of mixer tap, an example of which is given in FIG. 1, the mixer tap has a lever-type handle 1. The user can control the rate of flow of water exiting the spout (the water outlet is a spout in this case) by lifting the lever, or more technically by pivoting the lever in a plane that includes the axis A of the tap, as indicated by arrow F in FIG. 1. Note: whilst the mixer tap in FIG. 1 has an associated spout, and the base of the spout is mounted directly beneath with the base/heel of the tap lever, nevertheless these kinds of lever-type mixer taps are also often used to control the flow of water (and the temperature of said flow) from other kinds of water outlets too, and the outlet may be located remotely or some distance away from the tap, such as e.g. a showerhead, or a bath spout, etc. An example of such a lever-type mixer tap which might be used to control the flow (and temperature) of water from a showerhead or bath spout, which is remote from the tap itself, is shown in FIG. 2. In any case, when the lever 1 is initially lifted as indicated by arrow F (i.e. lifted by only a small initial amount), the tap will be initially turned on and a small flow rate of water will flow from the outlet. If (or as) the lever is then lifted further, the flowrate of water exiting the outlet will increase. When the lever has been raised as far as it will go, the flowrate of water exiting the outlet will be at a maximum. Conversely, lowering the lever (i.e. opposite to arrow F) will reduce the flowrate of water flowing from the outlet, and lowering the lever as far as it will go will ultimately turn the tap off.

With mixer taps like the ones in FIG. 1 and FIG. 2, the user can also control the temperature of the water flowing out of the outlet. This is done by twisting or turning the lever about the axis A of the tap, as indicated by arrow T. Generally, when the lever is turned (as per arrow T) as far as it will go in one direction, this will be "full cold" (i.e. any water exiting the outlet when the lever is turned to this extreme be "full cold"), and when the lever is turned as far as it will go in the other direction, this will be "full hot". When the tap is on (to any extent), if the lever is then turned in the direction from "full cold" towards "full hot" the relative proportion of the water passing through the tap that comes from the hot water supply will increase commensurate with the relative position of the lever between the "full cold" and "full hot" positions, such that the temperature of the water flowing out of the outlet increases. And of course the same is true vice versa.

Turning now to so-called progressive mixer taps, these are a particular type, or subset, of mixer taps. A progressive mixer tap differs from the more general type of mixer tap described above in that, with a progressive mixer tap, whilst the user is (again) able to use the tap to control and adjust the temperature of the water exiting the water outlet, the user is usually unable to control or adjust the flowrate of the water exiting the outlet when the tap is on, or at least the user's ability to adjust the flowrate independently of water temperature is generally reduced in comparison with general mixer taps.

An example of a progressive mixer tap is given in FIG. 3. In a progressive mixer tap, like the one shown in FIG. 3 for example, there is generally only a single tap handle or knob which the user can grasp and turn about the tap axis to control the flow of water out of the water outlet associated with the tap (whatever this may be; e.g. bath spout, showerhead, etc). In a progressive mixer tap, this turning of the handle/knob is generally the only way that the handle/knob can move in normal operation of the tap. In FIG. 3, the particular example progressive mixer tap shown is illustrated with the tap's turnable knob 3 in a position just after the knob 3 has been turned (about the axis A) by a small initial amount in the direction indicated by arrow T2 (i.e. clockwise), and more specifically after the knob 3 has been turned from its "fully off" position to the position where water begins flowing out of the associated water outlet. When the knob 3 is in this position, the temperature of the water flowing out of the outlet will be "full cold". However, if (or as) the knob 3 is turned progressively further in the direction of arrow T2, the relative proportion of the water flowing from the outlet that comes from the hot water supply will increase commensurate with the amount that the knob 3 has been turned, such that the temperature of the water flowing out of the outlet will increase. And ultimately, when the knob 3 has been turned in the direction of arrow T2 (clockwise) as far as it will go, the water flowing from the outlet will be "full hot". Of course, turning the knob 3 back in the opposite direction (i.e. anticlockwise, opposite to arrow T2) will cause the temperature of the water flowing from the outlet to become cooler, right up until the knob 3 reaches the "fully cold" position depicted in FIG. 3 whereupon the temperature of the water exiting the outlet will again be "fully cold". Then, when the knob 3 is turned further from the "fully cold" position back to its original extreme starting/"fully off" position, the flow of water from the water outlet will cease entirely and the tap will be complete and off.

As mentioned above, in progressive mixer taps, the user is normally unable to control the flowrate of the water exiting the outlet when the tap is on, or at least the user's ability to adjust the flowrate independently of water temperature is significantly reduced in comparison with other forms of mixer taps (like those in FIG. 1 and FIG. 2 for example).

By way of further explanation, in some progressive mixer taps, if the tap's handle/knob is turned from the initial "off" position by a small initial amount to the "full cold" position, water (then at "full cold" temperature) will immediately begin flowing out of the associated water outlet at "full" flowrate or pressure, or at least the water will very quickly (with very little turning of the tap handle/knob from the initial "off" position) reach the maximum or "full" flowrate. And furthermore, in these kinds of mixer taps, if the handle/knob is then turned progressively further (thereby causing the water temperature to increase), nevertheless the flowrate or pressure of the water flowing from the water outlet generally will not change much (if at all) even though the temperature of the water does change, as explained above.

However, in other kinds of progressive mixer taps, if the tap's handle/knob is turned from the initial "off" position by a small initial amount to the "full cold" position, water (then at "full cold" temperature) will begin flowing out of the associated water outlet initially at only a relatively small flowrate or pressure, and then it is only with further progressive turning of the tap's handle/knob (which also causes the temperature of the water flowing from the outlet to increase) that the flowrate of water exiting the outlet increases.

Thus, in summary, in some progressive mixer taps, water begins exiting the outlet at roughly full pressure immediately (or very soon after) the tap is initially turned on, whereas in other forms of progressive mixer taps, the flowrate of water exiting the outlet increases as the tap is progressively turned more "on", such that in these latter forms of mixer taps, the flowrate and the temperature of the water exiting the water outlet generally rise and fall together as the tap is turned "more on" and "more off" respectively. In either case though, it will be understood that, with progressive mixer taps, the user is generally either unable to control the flowrate of the water exiting the outlet much (if at all), or otherwise the user is unable to adjust the flowrate of the water independently from adjusting the temperature of the water.

Despite the apparently reduced control that progressive mixer taps give to the user, at least in terms of separately controlling flow rate and temperature, nevertheless progressive mixer taps are often (and they are increasingly being) used because, by providing only a single tap handle or knob that can be turned to adjust water temperature, they may take up less room and/or they be less obtrusive and/or they may be aesthetically preferable, compared to providing two separate taps for hot and cold water respectively, or even in comparison with other forms of mixer taps like e.g. the more conventional mixer taps described above in which a (potentially bulky or less elegant looking) lever-like handle may be needed. Aesthetics, therefore, are often a large part of the reason why progressive mixer taps are used or chosen instead of other forms of taps (and also why they have become popular).

Generally, the temperature indication markings for conventional and previous progressive mixer taps (i.e. the markings or colourings or other visual indications which allow the user to determine how the water temperature will change as the tap handle is turned) need to be located on or surrounding or otherwise closely nearby the tap's handle or knob, so that they can be seen by the user. However, this in turn means that, with conventional and previous progressive mixer taps, these temperature indication markings are generally visible at all times, even when the tap is off and not in use. And this (i.e. the fact that the temperature indication markings are visible at all times, even when the tap is not in use) can be visually unappealing. For example, often, temperature indication markings incorporate bright/bold colours (e.g. blue for cold and red for hot, possibly with a transition through yellow or orange etc in between); however these colours of the temperature indication markings (which may be quite bold and visually noticeable) may not match (or suit at all) the overall colour scheme or design or feel of e.g. the sink or basin or shower or bathroom where the progressive mixer tap is to be located and used. Likewise, even non-coloured temperature indications (like the ones shown in FIG. 3 for example) may be unsightly or out of keeping with the overall desired design or feel.

It is therefore thought that it might be desirable if a tap (including but not necessarily limited to a progressive mixer tap) could be provided where markings such as (but not necessarily limited to) temperature indication markings are not noticeable when the tap itself is not in use. It is also thought that it might be desirable if a tap (including but not necessarily limited to a progressive mixer tap) could be provided with improved overall aesthetics, including functional aesthetics (the term "functional aesthetics" here is intended to include the impression or sensation or overall "feel" associated with the tap's function and movement, as perceived by the user).

Notwithstanding the previous paragraph, it is to be clearly understood that application of the invention may also be possible to turnable handles, knobs and the like used to operate or control devices other than water taps. It is also to be clearly understood that mere reference herein to any previous or existing devices, apparatus, products, systems, methods, practices, publications or to any other information, or to any problems or issues, does not constitute an acknowledgement or admission that any of those things, whether individually or in any combination, formed part of the common general knowledge of those skilled in the field, or that they are admissible prior art.

SUMMARY OF THE INVENTION

In a first form, the invention relates broadly to a tap assembly including:

a flow control mechanism (this might be e.g. a tap valve, a progressive mixer tap cartridge, or the like), a spindle (or equivalently a rod or a shaft or some other like elongate member or part) associated with the flow control mechanism and which is operable in use to rotate about its principal (i.e. its longitudinal) axis in order to thereby operate the flow control mechanism, and a handle which is connected (directly or indirectly) to, or which is operable to be connected (directly or indirectly) to, the spindle, such that, in use, a user can turn the handle by hand to thereby rotate the spindle, wherein the location on the handle (or the geometric centre of that location in a plane perpendicular to the spindle's principal axis) where the spindle connects to the handle may coincide with the spindle's principal axis but it does not coincide with the centroid of the handle's planform shape, and consequently when the handle is turned by a user in use, the handle rotates about the spindle's principal axis (i.e. about the location where the spindle connects to the handle, the centre of which coincides with the spindle's principal axis) and the handle (or at least the centroid of the handle's planform shape) also moves or translates relative to (in a plane perpendicular to) the spindle's principal axis.

It is mentioned above that the location on the handle (or the geometric centre of that location) where the spindle connects to the handle does not coincide with the centroid of the handle's planform shape. In this regard, the handle's "planform shape" is the shape of the handle in a plane perpendicular to the spindle's principal axis (which is also the handle's axis of rotation). Also, the term "centroid" has its normal mathematical meaning. Hence, in the context of the handle's "planform shape", which as just described is a planar shape (because it is the shape of the handle in a plane perpendicular to the spindle's axis), the centroid is the overall geometric center of the handle's planform shape, or more technically the arithmetic mean (or average) position of all the points in the handle's planform shape.

In the first form of the invention summarised above, the handle may be (or the handle and the spindle may together be) turnable between two extremes of rotation, namely an initial position ("fully off") and a final position ("fully on"). The amount of rotation between these two extremes may be less than 360°, so that the handle (and spindle) cannot be rotated by more than one full revolution. In any case, when the handle is in the initial position there may be an area, or portion of a surface (and possibly one or more markings or colours or the like on the said area or on the said portion of a surface), which is (or are) obscured from a user's view by the handle (or which is/are alternatively underneath or covered or hidden by the handle or part thereof, or the appearance thereof may be affected by the position of the handle). However, when the handle is initially turned from the initial position towards the final position, the said area or surface portion may begin to be revealed (or uncovered or un-hidden, or the effect on its appearance due to the position of the handle may changes). Furthermore, with further rotation of the handle towards the final position, more of, or different parts of, said area or surface portion may become revealed (or more uncovered or more un-hidden or the effect on its appearance due to the position of the handle may changes more).

It was mentioned above that the amount of rotation between the two ("fully on" and "fully off") extremes of rotation of the handle may be less than 360°. In some preferred embodiments of the invention, the amount of rotation between the two extremes may be approximately 180° or less. The reason this may be preferable is because, as explained above, when the handle is turned, the handle not only rotates but it also moves or translates relative to the spindle's principal axis. Generally, as the handle rotates from 0° (i.e. from its initial position) up to 180°, the distance of the handle's movement or translation away from its initial position will also increase. However, if the handle were to rotate by more than 180° from its initial 0° ("fully off") position, the handle would again begin to move or translate back towards (or at least it would begin to again move closer to) its initial position. It is thought that it would be preferable if the distance of the handle's movement or translation away from its initial (0°/"fully off") position were maximum when the handle reaches its final/"fully on" position. This can be achieved if the extent of rotation between the two extremes of rotation is 180° or less.

In some embodiments it may be the case that, when the handle is connected to the spindle and the tap assembly is installed for use, and when the handle is in the initial position described above, the perimeter of the area or surface portion, which is then obscured from the user's view (or which is underneath or covered or hidden by the handle or part thereof, or the appearance of which is affected by the position of the handle—see above), is aligned with the perimeter of the planform shape of the handle. Also, the handle may be positioned against or close to the said area or surface. In other words, any gap or space that may exist between the handle and the said area or a surface (such a gap or space may exist to prevent contact or significant friction between the two when the handle moves), may nevertheless be small or minimal. In any case, because the handle may be positioned against or close to the said area or surface (or the gap between the two may be small) consequently, when the handle is in the initial position, the user should be unable to see the said obscured area or surface portion (or at least they should not be able to see much if any of it), even through any gap that may exist therebetween, and even if viewed from the side or at an acute angle.

In some embodiments, the said area or surface portion, which is obscured from a user's view by the handle when the handle is in the initial position (or which is alternatively underneath or covered or hidden by the handle or part thereof, or the appearance thereof is affected by the position of the handle), may be provided as (or it may be provided as part of or on) a separate component (hereafter referred to as the "hide-reveal component") which can be assembled together with other parts of the tap assembly. In such embodiments, in assembling and installing the tap assembly (e.g. as part of installing it horizontally in a vertical wall, or vertically in a horizontal surface of a countertop, or benchtop, or sink, or the like):

(a) the hide-reveal component may be positioned and oriented, and then secured, in the position and orientation it is to have in use, (and if necessary, or if not already done, the flow control mechanism may be positioned, oriented and secured in the position and orientation it is to have in use);

(b) subsequent to (a) the spindle associated with the flow control mechanism can be turned to the initial ("fully off") position; and (c) subsequent to (b), in order to connect the handle to the spindle at the correct orientation relative to the spindle, the handle can be oriented in its initial ("fully off") position (i.e. it can be oriented into the orientation in which it should be in "in use", relative to both the spindle and the hide-reveal component, when it is in the initial ("fully off") position) and then connected to the spindle in this orientation.

It has been mentioned that the tap assembly (summarised above) includes a flow control mechanism. In some embodiments, the flow control mechanism may be a simple valve, such as a valve for a hot water tap or a cold water tap (e.g. a conventional "jumper"-type valve as is commonly used for these). In these embodiments where the flow control mechanism is a valve, the spindle may be part of the valve and it may extend from a portion of the valve, although the spindle should also be a rotatable relative to other parts of the valve, and the tap assembly also may include a housing inside which at least a portion of the valve is received and housed when the tap assembly is assembled and installed for use.

In alternative embodiments, however, the flow control mechanism may instead be a mixer cartridge for a mixer tap, including (as may often be the case) a progressive mixer tap cartridge. In the particular embodiments where the cartridge is a progressive mixer tap cartridge, the spindle may be part of the cartridge and it may extend from a portion of the cartridge, although the spindle should also be rotatable relative to other parts of the cartridge, and the tap assembly may also include a housing inside which at least a portion of the cartridge is received and housed when the tap assembly is assembled and installed for use.

In either case (i.e. whether the flow control mechanism is a valve, or a cartridge such as a progressive mixer cartridge), the tap assembly may further include a means for securing the valve/cartridge within the housing, such that, when the tap assembly is assembled and installed for use, the valve/cartridge is substantially immovable relative to the housing, albeit the spindle should still be rotatable about its principal axis relative to other parts of the valve/cartridge. In some of the particular embodiments that were mentioned above, namely where the flow control mechanism is a progressive mixer tap cartridge, the means for securing the cartridge within the housing may includes a lock nut which is operable such that, after the cartridge has been correctly positioned within the housing, the lock nut can be screwed into the housing (or into a portion thereof) to (either by itself, or together with one or more other components or features) secure the cartridge (except for the spindle) in position.

As alluded to in passing above, the tap assembly may be operable to be installed in a surface structure, such as e.g. a wall panel, in which case the tap assembly will generally be installed horizontally in or through the vertical wall panel, or the tap assembly may alternatively be installed in a horizontal surface structure such as a sink or counter top, in which case the tap assembly will be installed vertically in the sink/countertop. In any case, when the tap assembly is installed in the surface structure, a portion of the housing may protrude from a first side of the surface structure (this first side may be the side of the wall, or the upper surface of the countertop, etc, on which the tap handle is accessible to the user) and a portion of the housing may also protrude from an opposite second side of the surface structure (this second side may be the back of the wall panel, possibly inside the wall cavity, or the underside of the countertop or benchtop underneath the sink), and the tap assembly may further include at least one securing member operable to be connected to the housing on the first side and at least one securing member operable to be connected to the housing on the second side, wherein, when so connected to the housing, the said securing members are further operable such that, between them, they engage with the surface on the first side of the surface structure and with the surface on the second side of the surface structure and secure the housing relative to the surface structure.

In some embodiments, the securing member (or at least one of them) mentioned in the previous paragraph, which is (or which are) operable to connect to the housing and to engage the surface on the first side of the surface structure, may be (or its/they may include) the hide-reveal component. Recall from above that the hide-reveal component (although maybe more than one of them) is/are component(s) which provides the area or surface portion, which is obscured from a user's view by the handle when the handle is in the initial position.

A number of possible alternative forms that the invention may take will now be summarised. It is to be clearly understood that, whilst these possible alternative forms of the invention will be described more briefly, and elaborated on less, than the first form of the invention described above, nevertheless any of the features or aspects or embodiment possibilities described in connection with the first form of the invention above may also apply to the alternative forms of the invention described below (except where the contrary is clearly apparent or necessary).

In a second form, the invention relates broadly to a handle for a tap assembly, wherein the tap assembly is a type that includes:

a flow control mechanism (as above, this flow control mechanism could be a tap valve, progressive mixer tap cartridge, etc), and a spindle (or rod or shaft or the like) associated with the flow control mechanism and which is operable in use to rotate about its principal axis in order to thereby operate the flow control mechanism, and the handle is configured in such a way that:

the handle is operable to be connected to the spindle such that, in use, a user can grasp the handle by hand and turn it to thereby rotate the spindle, and the location on the handle (or the geometric centre of that location in a plane perpendicular to the spindle's principal axis) where the spindle connects to the handle may coincide with the spindle's principal axis but does not coincide with the centroid of the handle's planform shape, and consequently when the handle is turned by a user in use, the handle rotates about the spindle's principal axis and the handle (or at least the centroid of the handle's planform shape) also moves or translates relative to (in a plane perpendicular to) the spindle's principal axis.

In a third form, the invention relates broadly to an assembly including:

a housing which is:
  operable to receive a tap flow control mechanism that has a spindle (or rod or shaft or the like) which can rotate about its principal axis to operate the flow control mechanism; and
  operable to be received and held in place in a surface structure in which the assembly is to be installed; and a tap handle which is operable to be connected to the spindle of the tap flow control mechanism such that, in use, a user can grasp the handle by hand and turn it to thereby rotate the spindle, and wherein the location on the handle (or the geometric centre of that location in a plane perpendicular to the spindle's principal (longitudinal) axis) where the spindle connects to the handle coincides with the spindle's principal axis but does not coincide with the centroid of the handle's planform shape, and consequently when the handle is turned by a user in use, the handle rotates about the spindle's principal axis and the handle also moves or translates relative to the spindle's principal axis.

In each of the second and third forms of the invention summarised above, in use, the handle (or the handle and spindle) may be (or they may together be) turnable between two extremes of rotation, namely an initial position ("fully off") and a final position ("fully on"). And just like for the first form of the invention described above, the amount of rotation between these two extremes may be less than 360°, preferably approximately 180° or less. Furthermore, as above, it may be that when the handle is in the initial position there is an area, or portion of a surface (and possibly one or more markings or colours or the like thereon), which is obscured from a user's view by the handle (or which is underneath or covered or hidden by the handle or part thereof, or the appearance thereof may be affected by the position of the handle), but when the handle is initially turned from the initial position towards the final position, the said area or surface portion may begin to be revealed (or uncovered or un-hidden or the effect on its appearance due to the position of the handle changes), and with further rotation of the handle towards the final position, more of, or different parts of, said area or surface portion may become revealed (or more uncovered or more un-hidden or the effect on its appearance due to the position of the handle changes more).

In a fourth form, the invention relates broadly to a handle for a rotatable control of (or a handle for a rotatable control on or associated with) a user-controllable device (or mechanism, or system or the like), the said device (or mechanism or system etc) including:

a control element (this control element may be a tap valve or a progressive mixer tap cartridge, etc, as described above, or alternatively it could be an electromechanical control device, gas flow control valve, or the like—see further below), a spindle (or rod or shaft or the like) which is associated with (or functionally linked to) the control element and which is operable in use to rotate about its principal axis in order to thereby operate the control element, and wherein the handle is operable to be connected to the spindle such that, in use, a user can grasp the handle by hand and turn it to thereby turn the spindle, and the location on the handle (or the geometric centre of that location in a plane perpendicular to the spindle's principal axis) where the spindle connects to the handle may coincide with the spindle's principal axis but it does not coincide with the centroid of the handle's planform shape, and consequently when the handle is turned by a user in use, the handle rotates about the spindle's principal axis and the handle also moves or translates relative to (in a plane perpendicular to) the spindle's principal axis.

As for the other forms of the invention described above, in the fourth form of the invention, in use, the handle (or the handle and spindle) may be (or they may together be) turnable between two extremes of rotation, namely an initial position ("fully off") and a final position ("fully on"). And just like for the other forms of the invention described above, the amount of rotation between these two extremes may be less than 360°, preferably approximately 180° or less. Furthermore, as above, it may be that when the handle is in the initial position there is an area, or portion of a surface (and possibly one or more markings or colours or the like thereon), which is obscured from a user's view by the handle (or which is underneath or covered or hidden by the handle or part thereof, or the appearance thereof may be affected by the position of the handle), but when the handle is initially turned from the initial position towards the final position, the said area or surface portion may begin to be revealed (or uncovered or un-hidden or the effect on its appearance due to the position of the handle may change), and with further rotation of the handle towards the final position, more of, or different parts of, said area or surface portion may become revealed (or more uncovered or more un-hidden or the effect on its appearance due to the position of the handle may change more).

For the avoidance of doubt, any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description, and also the Background section above, make reference to a number of drawings as follows.

DETAILED DESCRIPTION

As has been mentioned previously, FIG. 4 to FIG. 8 all relate to one particular possible embodiment of the invention wherein the invention is applied to (or embodied as) a progressive mixer tap. The following Detailed Description will therefore be given (at least mainly) with reference to this particular progressive mixer tap embodiment. However, it is to be clearly understood that the invention is not necessarily limited in its application to progressive mixer taps. The invention could therefore also be applied to (or embodied in) forms or types of water taps other than a progressive mixer taps. The invention could therefore potentially be applied to even the simplest forms of conventional, separate hot and cold water taps, for example. Furthermore, as has been mentioned, application of the invention may also be possible to turnable handles, knobs and the like used to operate or control devices other than water taps. This might include, by way of illustrative example only, turnable handles associated with gas appliances such as the control dials/handles for individual burners on a gas barbecue, or the turnable control knob used to control the operation of electrical appliances, like the turnable temperature control dial/knob on an electric oven or the speed control dial/knob on an electric fan, etc.

In any case, turning now to the particular progressive mixer (water) tap embodiment depicted in FIG. 4 to FIG. 8, the various parts and components that make up the progressive mixer tap assembly in this embodiment, which are most dearly depicted in FIG. 4, will first be described so that their operation and interconnectedness may be better understood.

Figure 1:
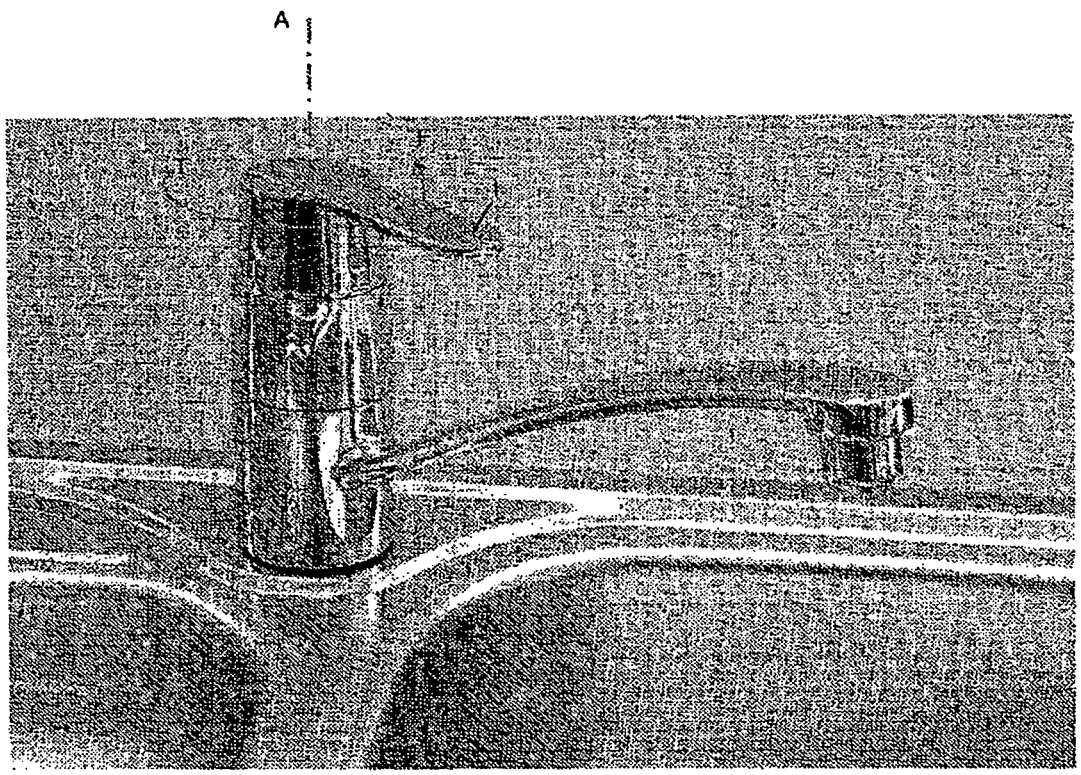
FIG. 1 and FIG. 2 are examples of conventional mixer taps of the kind which incorporate a lever that can be lifted to regulate water flowrate and also turned to regulate water temperature.
Figure 2:
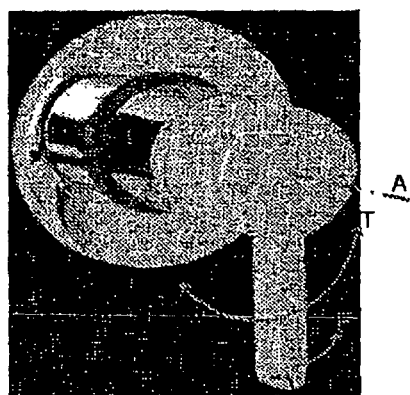
Figure 3:
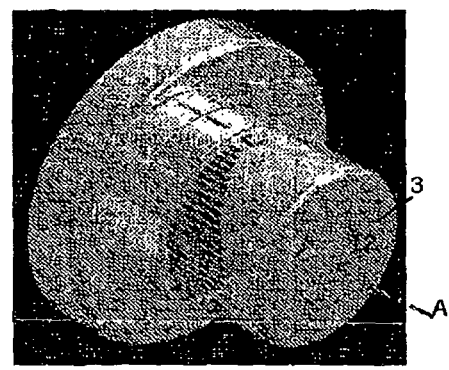
FIG. 3 is an example of a conventional progressive mixer tap.
Figure 4:
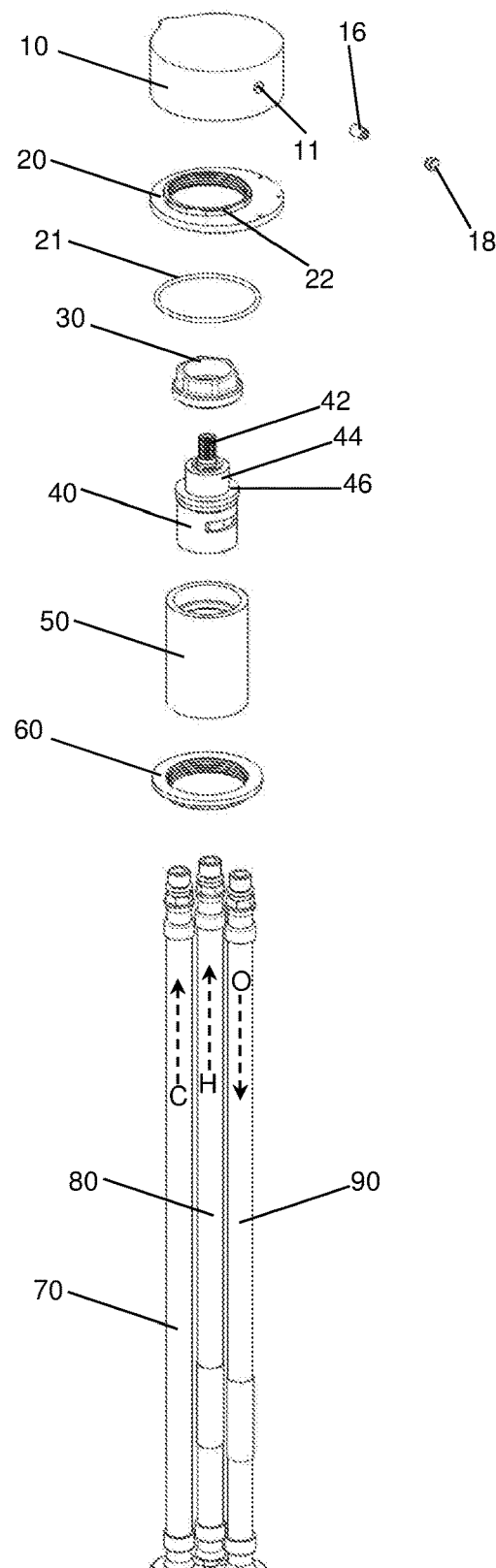
FIG. 4 is an exploded perspective view of a progressive mixer tap assembly in accordance with one particular possible embodiment of the present invention.

As shown in FIG. 4, the primary parts and components that make up the progressive mixer tap assembly (moving from top to bottom in FIG. 4) are:
- the handle 10 of the tap;
- a base ring 20;
- a lock nut 30;
- a progressive water flow control cartridge (this will be referred to hereafter simply as the "progressive cartridge" or simply the "cartridge") 40;
- a housing 50;
- a back nut 60; and
- inlet and outlet hoses—more specifically there is a cold water inlet hose 70, a hot water inlet hose 80 and a water outlet hose 90.

When the overall assembly is put together, connected/ "plumbed in" and installed for use, the handle 10 (as its name suggests) is the part of the assembly which a user can grasp by hand and turn in order to operate the progressive mixer tap. The way in which the handle 10 turns in use—or perhaps more accurately the way in which it "moves" when turned by the user—will be discussed in greater detail below.

Figure 6:
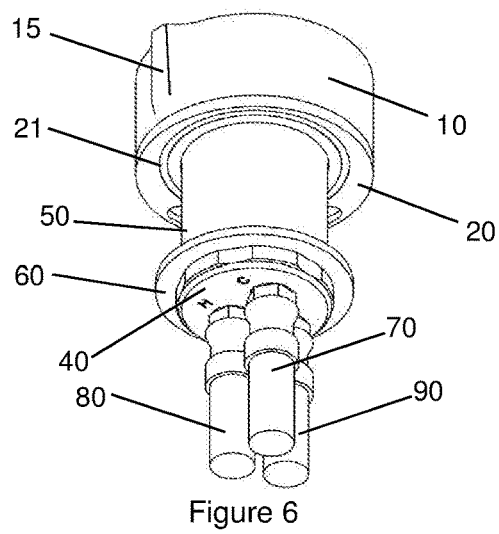
FIG. 6 is a perspective view, from slightly below and to the side, of the progressive mixer tap assembly in FIG. 4 when fully assembled.

At the opposite end of the assembly from the handle, it can be seen from FIG. 4 and FIG. 6 that the two inlet hoses and the outlet hose are connected to respective inlet and outlet connection points on the bottom of the progressive cartridge 40 (these inlet and outlet connection points are evident but not individually visible in the Figures). Thus, the cold water inlet hose 70 carries cold water from the cold water supply and delivers this into the cartridge 40. Likewise, the hot water inlet hose 80 carries hot water from the hot water supply and delivers this into the cartridge 40. When the tap is off, no water flows through (or out of) the cartridge 40. However, when the tap is operated (i.e. turned on), cold and hot water (in some relative proportion—the relative proportion depends on how far the handle 10 is turned) flow from the respective cold and hot water inlet hoses 70 and 80 into the progressive cartridge 40, and the cold and hot water then mix inside the cartridge 40. The mixed or outgoing water (which will be at some temperature ranging from the temperature of the cold water supply at one extreme to the temperature of the hot water supply at the other extreme) then exits the progressive cartridge 40 via outlet hose 90. The outlet hose 90 then carries the mixed or outgoing water to whatever the water outlet is that the tap is being used to operate, for example, a basin spout, a bath spout, a showerhead, etc.

Note that the above explains the basic overall operation of the cartridge 40 (i.e. what it does). The full details of how the cartridge 40 itself works (i.e. how it controls the proportions of hot and cold water that mix therein, the internal components and workings of the cartridge 40, etc) are not crucial or even relevant to the present invention. Indeed, progressive water flow control cartridges like the cartridge 40 depicted in FIG. 4 are readily available for purchase, and any such readily available progressive water flow control cartridge could potentially be used, that is, where the present invention is embodied in or as a progressive mixer tap anyway. By way of mere example only, any of the progressive water flow control cartridges produced by Flühs Drehtechnik GmbH (www.fluehs.de) in their "Progressiv" range could potentially be used.

When the overall assembly is put together, the progressive cartridge 40 is positioned (housed) within the hollow inside of the cylinder-shaped housing 50. The position of the cartridge 40 within the housing 50 (in the vertical/axial direction) is such that the bottom end of the progressive cartridge 40 protrudes slightly from (or it is at least accessible through) the open base end of the housing 50. This is so that the inlet and outlet hoses 70, 80, 90 can be connected to the connection points on the bottom of the cartridge 40 when the progressive mixer tap assembly is being installed and "plumbed in" (see FIG. 6). Also, when the overall assembly is put together, the position of the cartridge 40 within the housing 50 (in the vertical/axial direction) is also such that at least a portion of the cartridge's spindle 42, which itself projects from the top end of the cartridge 40, extends out through the open top end of the housing 50. This is so that the handle 10 can be connected to (or installed on) the spindle 42, thereby connecting the handle 10 to the cartridge 40, something which is generally done during the final stages of installation (see below).

Figure 7:
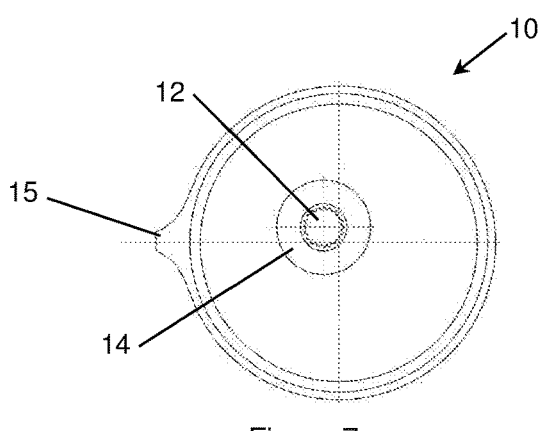
FIG. 7 is a view of the underside of the handle in the progressive mixer tap assembly in FIG. 4 showing, in particular, the eccentric (or "off centre") location where the handle connects to the spindle of the assembly's progressive water flow control cartridge.

By way of further explanation, as shown in FIG. 7 (which is a view from the underside of the handle 10), there is a vertically oriented spindle receiving aperture 12 on the underside of the handle 10. In the particular embodiment shown, the spindle receiving aperture 12 is actually formed as the interior of a hollow cylindrical portion 14 that is itself formed integrally with the rest of the handle 10. It can be seen in FIG. 7 that the internal surface of the hollow cylindrical portion 14, which is what defines the spindle receiving aperture 12 in this case, actually has a "sawtooth" or jagged profile when viewed in the underside plan view in FIG. 7. This "sawtooth" profile matches an identical (or very similar) external sawtooth profile on the outside of the cartridge's spindle 42. Therefore, when the handle 10 is installed on the cartridge 40, the cartridge spindle 42 (or at least an upper portion of it) inserts into the spindle receiving aperture 12 in the handle, whereupon the vertically oriented ridges and valleys of the sawtooth profile on the outside of the spindle 42 slide into the corresponding vertically oriented valleys and ridges in the spindle receiving aperture 12. The consequent physical engagement between the ridges/valleys of the sawtooth profile on the spindle 42, and the valleys/ridges in the spindle receiving aperture 12, helps to ensure that, when the handle is then grasped and turned by a user in use, this in turn causes the cartridge spindle 42 to turn with the handle, as opposed to the handle 10 twisting on the cartridge spindle 42 and turning relative to the (stationary) spindle 42. In other words, the engagement between the ridges/valleys of the spindle 42 and the valleys/ridges of the aperture 12 ensures that, when the handle 10 is turned, the spindle 42 turns with it. And of course, the remainder of the progressive cartridge 40 remains fixedly held in position (and is prevented from rotating) within the housing 50, so that when the handle 10 is turned, thereby causing the spindle 42 to turn, the spindle 42 consequently rotates relative to the stationary body of the cartridge 40. This is therefore how the cartridge 40 is operated, i.e. by turning the spindle 42 (and this in turn is done by turning the handle 10 that is connected to the spindle 42).

It can also be noted from FIG. 7 that the axis/centre of the spindle receiving aperture 12 on the underside of the handle 10 is eccentrically offset relative to the axis/centre (or more accurately relative to the centroid) of the handle 10 itself (as can be seen, the handle 10 itself is basically circular in plan view from above or below). The reason for this eccentric offset of the spindle receiving aperture 12 relative to the circular centre of the handle 10, and its significance, will be explained further below.

Figure 5:
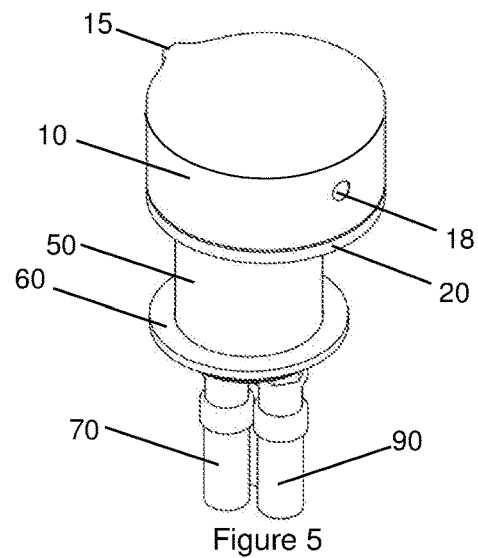
FIG. 5 is a perspective view, from slightly above the tap handle, of the progressive mixer tap assembly in FIG. 4 when fully assembled.

FIG. 4 shows that the assembly also includes a grub screw 16 and a cap 18. The purpose of the grub screw 16 is to secure the handle 10 on the cartridge spindle 42. By way of further explanation, there is a hole 11 extending through the vertical outer/perimeter side wall of the handle 10. The hole 11 is visible in FIG. 4. The hole 11 is circular and sized to (preferably just) allow the grub screw 16 to pass therethrough. There is also another (second) hole in the handle 10. This second hole is not illustrated in the figures, but it extends through the full wall thickness of the hollow cylindrical portion 14 (the hollow cylindrical portion 14 at least is shown in FIG. 7). The said second hole is also aligned (i.e. it shares the same principal/longitudinal axis) with the hole 11, and it is sized and threaded such that the grub screw 16 can be screwed directly into it. Therefore, during the final stages of assembly, the grub screw 16 can be placed onto the end of a tool such as an Allen key (or the like), this can then be used to insert the grub screw 16, first through the first hole 11, and then into the second hole (not illustrated) in the cylindrical portion 14. Then the grub screw 16 can be turned (using the Allen key or the like) so that it is screwed into the second hole. As just mentioned, the insertion of the grub screw 16 is performed as one of the final stages of assembly. Basically, after the handle 10 has been installed on the cartridge spindle 42 (such that the cartridge spindle 42 inserts into the spindle receiving aperture 12, etc, as explained above), the grub screw 16 is then inserted and screwed into the second hole, and because the said second hole extends all the way through the wall thickness of the cylindrical portion 14, when the grub screw 16 is screwed all the way into the second hole, the inner end of the grub screw 16 comes into contact with and presses firmly and directly against the cartridge spindle 42 (remember that, by this time, the cartridge spindle 42 is residing within the spindle receiving aperture 12). This direct (and firm) engagement of the grub screw 16 against the spindle 42 secures the handle 10 relative to the spindle 42, and hence it secures the handle 10 relative to the cartridge 40 by preventing the handle 10 from simply lifting or sliding off the cartridge spindle 42. The purpose of the cap 18 mentioned above is to effectively "plug" the hole 11 in the outer side wall of the handle 10 after the grub screw 16 has been inserted and screwed in (and after the Allen key or other tool used for this has been removed). Thus, as shown in FIG. 5, when the cap 18 is inserted into the hole 11, this effectively "plugs" the hole 11 leaving a preferably smooth/clean and ideally unbroken or even invisible finish (this is mostly for aesthetic reasons, although it may also help to possibly prevent or deter tampering with or removal of the grub screw).

As mentioned above, when the overall assembly is put together, the progressive cartridge 40 is positioned (housed) inside the housing 50. The cartridge 40 is actually inserted into the housing 50 through the open top end of the housing 50, and the housing 50 contains an internal ridge or other formation (not shown), or a separate component (not shown) may be inserted which performs the same function, namely preventing (or blocking) the cartridge 40 from sliding al the way through and out through the bottom of the housing 50. Once the cartridge 40 has been inserted into the housing 50, in order to then secure the cartridge 40 within the housing 50 (and in particular to stop it from coming back out through the top of the housing 50), the lock nut 30 is inserted into the housing on top of the cartridge 40. The lock nut 30 is generally in the form of a ring, at least to the extent that it has a round axial opening extending through its full thickness. This through opening in the centre of the lock nut 30 exists so that, when the lock nut 30 is inserted into the housing 50 on top of the cartridge 40, the pedestal portion 44 on the cartridge 40 inserts into or through the central opening in the lock nut. The spindle 42 extends from the top of the pedestal portion 44 on the cartridge. Therefore, even when the lock nut 30 is inserted into the housing 50 on top of the cartridge 40, the pedestal portion 44 can extend up through the lock nut such that the spindle 42 can still extend up and out through the open top of the housing 50.

The upper portion of the lock nut 30 has an outer surface that is shaped generally as a (regular) hexagon. This enables the upper portion of the lock nut 30 to be turned using a socket or other like tool. The lower end of the lock nut, below the hexagonal-shaped portion, is actually circular and of greater diameter than any part of the hexagonal portion. The outer vertical side of this lower circular portion on the lock nut is threaded, and these threads can screw into corresponding threads which are cut (or otherwise formed) in a portion of the internal surface inside the housing 50 (naturally the internal diameter of the portion inside the housing 50 into which the lock nut 30 screws is the same as the outer diameter of the threaded portion of the lock nut 30). (Alternatively, in some embodiments the housing may be made from a comparatively soft material such as plastic or polymer, and initially there may be no threads formed on the inside of the housing to receive the threads of the lock nut 30, but the softness of the housing material may be such that when the lock nut 30 is screwed down into the upper end of the housing, the threads on the lock nut 30 may be "self-tapping" and they may therefore progressively cut their own corresponding threads into the housing 50 as the lock nut is screwed in.)

In any case, when the lock nut 30 is inserted into the housing on top of the cartridge 40, it can be turned (using a socket or similar tool) so as to screw down into the housing 50. More specifically, screwing the lock nut 30 down into the housing 50 in this way ultimately causes the underside of the lock nut's lower circular portion to press firmly against the upwardly-facing rim 46 on the cartridge 40. Not only does this thereby prevent the cartridge 40 from being lifted vertically back up out of the housing 50, but the pressure imposed on the cartridge 40 by the lock nut 30 also helps to secure the cartridge 40 in position and prevents it from twisting within the housing (e.g. so that the body of the cartridge 40 does not turn when a user turns handle 10 to rotate the spindle 42).

When the overall progressive mixer tap assembly is being installed—note: this could be done, for example, with the tap assembly installed vertically into a horizontal countertop or basin top or the like, or alternatively with the tap assembly installed horizontally in a vertical wall, etc—in any case a hole is required (extending through the countertop or wall etc) which is of sufficient size to allow the housing 50 to extend therethrough.

Thus, considering (by way of illustrative example only) a situation where the assembly is being installed vertically in a horizontal countertop (not illustrated), after the hole (not illustrated) in the countertop has been formed (if necessary), the housing 50 (which then contains the progressive cartridge 40) is positioned in the said hole in the countertop such that the upper portion of the housing 50 (and also the projecting cartridge spindle 42, etc) projects up and out through the top of the hole, while at the same time the bottom end of the housing 50 still extends down below the hole on the underside of the countertop. The back nut 60 is used to prevent the housing 50 (and any other parts of the assembly attached to or connected with the housing) from lifting up and out through the top of the hole in the countertop once the tap has been fully installed.

By way of further explanation, it will be seen that the back nut 60 is generally in the form of a ring, at least to the extent that it has a round axial opening extending through its full thickness. This through opening in the centre of the back nut 60 is also internally threaded (as shown in FIG. 4), and these threads may screw onto corresponding threads (not shown) which are formed on the outer service on the lower end of the housing 50. (Alternatively, in some embodiments the housing may be made from a comparatively soft material such as plastic or polymer, and initially there may be no threads formed on the outer surface on the lower end of the housing, but the softness of the housing material may be such that when the back nut 60 is screwed onto the lower end of the housing, the threads in the back nut 60 may be "self-tapping" and they may therefore progressively cut their own corresponding threads into the outer surface of the housing 50 as the back nut 60 is screwed on.)

As shown in FIG. 4 and FIG. 6, the lower portion of the back nut 60 has an outer surface with alternating indents and detents in it. (In alternative configurations, this lower portion of the back nut 60 may have an outer surface which is knurled, or in some other way shaped, or textured, or treated, etc, to improve grip.) In any case, the lower portion of the back nut 60 is therefore shaped such that it is able to be grasped/gripped and turned by the user (either by using a tool by hand). The upper portion of the back nut 60, above the said "grippable" portion, is circular and of greater diameter than any part of the grippable portion. Actually, the upper end of the back nut 60 has an annular upper surface which is quite wide and flat, and the diameter of this wide flat annular portion/surface of the back nut 60 is greater than the diameter of the hole in the countertop. Therefore, when the back nut is screwed onto the bottom of the housing 50, this then prevents the housing 50 (and any other parts of the assembly attached to or connected with the housing) from being pulled up and out through the hole in the countertop.

Often, it may be easier for the back nut 60 to be screwed onto the lower end of the housing 50 before the inlet hoses 70 and 80 and the outlet hose 90 are connected to the connection points on the bottom of the cartridge 40. This way, the back nut 60 can be screwed onto the bottom of the housing 50 without the hoses getting in the way, and also without the need to thread the back nut 60 over the hoses before screwing it onto the housing, as is necessary if the hoses are connected to the cartridge 40 before the back nut 60 is screwed onto the housing 50. In some instances though, for example if the amount (or how far) the back nut 60 needs to be screwed onto the housing 50 has not yet been determined, there may be a need to connect the hoses to the cartridge before screwing the back nut 60 onto the housing 50 (or before screwing it on all the way). In these instances, however, namely where the hoses are connected to the cartridge 40 before the back nut 60 is screwed onto (or screwed all the way onto) the housing 50, the back nut 60 must still (necessarily) at least be threaded onto/over the hoses before the opposite ends of the hoses are also connected to their respective water supplies or water outlet, otherwise it will not thereafter be possible to thread the back nut over the hoses.

It has been explained (for the purposes of example) that when the progressive mixer tap assembly is being installed vertically in a horizontal countertop, the housing 50 (which then contains the cartridge 40) is positioned in the hole in the countertop such that the upper portion of the housing 50 projects up and out through the top of the hole, while the bottom end of the housing 50 still extends down below the hole on the underside of the countertop. It has now also been explained that the back nut 60 can be screwed onto the lower end of the housing 50 to prevent the housing 50 from being pulled up and out through the hole in the countertop. The base ring 20 is the part which operates to prevent the housing 50 from sliding/falling down and out through the bottom of the hole in the countertop. This will now be explained further.

It will be seen from FIG. 4 that the base ring 20 is a generally flat, circular component. In fact, in this particular embodiment, the outer diameter of the base ring 20 is substantially the same as the outer diameter of the handle 10 (the handle 10 itself is also basically circular in this embodiment when viewed from above, except for the small additional protuberance 15). In any case, as shown in FIG. 5 and FIG. 6, in this embodiment, when the overall assembly is put together, and when the tap handle 10 is turned all the way to the "off" position (this is the position the handle 10 is shown in FIG. 5 and FIG. 6) the vertical cylindrical side of the handle 10 aligns (and is substantially flush) with the thin perimeter side edge of the base ring 20.

The base ring 20 also has a generally circular raised portion 22, and on the inside of this raised portion 22 is formed a circular opening which extends through the full thickness of the base ring 20. The diameter of this opening in the raised portion 22 is actually almost the full diameter of the raised portion 22. It should also be noted that the axis/centre of the raised portion 22 (and of the circular opening extending through it) is offset from the overall circular centre of the circular base ring 20. (In fact, the amount and direction that the axis/centre of the raised portion 22 is offset from the centroid of the base ring's planform shape is the same as the amount and direction that the axis/centre of the handle receiving aperture 12 is offset from the centroid of the handle's planform shape.) This is important, and the reason for this will be explained below. However, for present purposes, it is important to note that the through opening in the raised portion 22 is internally threaded, and these threads may screw onto corresponding threads (not shown) which are formed on the outer surface on the upper end of the housing 50. (Alternatively, in some embodiments the housing may be made from a comparatively soft material such as plastic or polymer, and initially there may be no threads formed on the outer surface on the upper end of the housing, but the softness of the housing material may be such that when the base ring 20 is screwed onto the upper end of the housing, the threads in the base ring 20 may be "self-tapping" and they may therefore progressively cut their own corresponding threads into the outer surface of the housing 50 as the base ring is screwed on.)

As also shown in FIG. 4, on the base ring 20, the outer edge of the raised portion 22 (which protrudes above the flat upper surface of the rest of the base ring 20) has alternating indents and detents in it. (In alternative configurations, this raised outer edge of the raised portion 22 may have an outer surface which is knurled, or in some other way shaped, or textured, or treated, etc, to improve grip.) In any case, the outer edge of the raised portion 22 is therefore shaped such that it is able to be grasped/gripped and turned by the user (either by using a tool by hand). Although the raised portion 22 and the circular opening therein are offset relative to the circular centre of the overall base ring 20, nevertheless the remainder of the base ring 20 is quite wide and flat overall, and the overall diameter of the base ring 20 is much greater than the diameter of the hole in the countertop. Therefore, when the base ring 20 is screwed onto the upper end of the housing 50, this then prevents the housing 50 (and any other parts of the assembly attached to or connected with the housing) from falling or sliding down through the hole in the countertop.

It will now be appreciated that it is the back nut 60 that prevents the housing 50 from being pulled up and out through the hole in the countertop, and it is the base ring 20 that prevents the housing 50 from falling or sliding down and out through the hole in the countertop. Therefore, it may now also be understood that, in order to firmly secure the overall tap assembly in the hole in the countertop (and e.g. stop the tap assembly from rattling or sliding up and down within the hole in the countertop) either the back nut 60 can be screwed further (as necessary) onto the lower end of the housing 50, or the base ring 20 can be screwed further (as necessary) onto the upper end of the housing 50, or both, such that together they clamp onto the underside surface and the upper surface of the countertop thereby clamping the overall assembly in place (and thus securing it firmly and immovably in position in the hole in the countertop).

FIG. 4 also shows a base O-ring 21. This base O-ring can also be seen in FIG. 6. And in fact, FIG. 6 illustrates that the base O-ring 21 is installed in a small annular channel that surrounds the opening on the underside of the base ring 20. When the base ring 20 clamps firmly against the upper surface of the countertop (see above) this causes the base O-ring 21 to become squashed into the channel and also against the upper surface of the countertop thereby forming a seal which stops water (e.g. water that may have leaked from the cartridge 40) from passing under the base ring 20 and onto the countertop or into the hole in the countertop. The base O-ring 21 therefore helps to prevent water damage to the countertop or under sink area. The base O-ring would do the same thing if the assembly were to be installed horizontally in a vertical wall.

It has previously been mentioned that, on the underside of the handle 10, the axis/centre of the spindle receiving aperture 12 (the aperture 12 being where the cartridge spindle 42 inserts when the handle 10 is connected to the cartridge 40) is eccentrically offset relative to the axis/centre of the handle 10 itself. In other words, the principal longitudinal/cylindrical axis of the spindle receiving aperture 12, and the principal cylindrical axis of the overall handle 10, are parallel to one another, rather than coincident. (The handle's principal axis corresponds to and extends through the "centroid" of the handle's overall circular planform shape, parallel to the outer perimeter side wall of the handle.) Put yet another way, the principal axis of the spindle receiving aperture 12 and the principal axis of the overall handle 10 (which extends through the centroid) are not one and the same axis, but rather they are separate axes which are parallel to one another but spaced apart from one another. The importance of this will be discussed further below.

At this point, however, it should be noted that, when the overall tap assembly is being put together and installed, it is important for the base ring 20, and the handle 10, respectively, to both be installed at the correct angular orientations. This may be achieved, for example, in the following manner. Firstly, continuing to refer to the above example where the tap assembly is being installed in a horizontal countertop, when the overall assembly is being secured to the countertop by screwing the base ring 20 and the back nut 60 onto the housing 50 so that these clamp the assembly to the countertop, the base ring 20 should be turned to the orientation in which it will ultimately reside in use before the two fully tighten on the countertop. As an example, in the particular installation orientation shown in FIG. 8, the desired final orientation of the base ring 20 is such that the "full cold" indicator marking C (which appears on the upper surface of the base ring 20) is at the tap's in use "12 o'clock" position. In other installations, the base ring 20 may have some different ultimate "in use" orientation. In any case, the base ring 20 may be screwed onto the housing 50 far enough (or perhaps the base ring 20 may be screwed onto the housing 50 and the housing 50, which at this point is still not fully clamped to the countertop, may then be turned slightly) so as set the base ring 20 at its final desired "in use" orientation; and thereafter the back nut 60 may be screwed onto the bottom end of the housing 50 as far as necessary for the countertop to become tightly clamped between the base ring 20 and the back nut 60. This thereby ensures that, when the assembly is thus clamped in position, the base ring 20 is in the correct orientation.

Next, it is important for the handle 10 to also be installed at the correct angular orientation. To achieve this, it should first be ensured that (the cartridge is secured within the housing and) the cartridge spindle 42 is turned all the way to its "off" position (i.e. the position of the spindle that will cause no water whatsoever to pass through the cartridge 40 when the tap is "plumbed in"). Once the cartridge spindle 42 is in this "fully off" position, it is possible to then install the handle 10 onto the spindle 42 at the correct orientation. This is done by ensuring that, before the handle 10 is slid/mounted onto the spindle 42 (i.e. before the handle 10 is placed onto the spindle 42 with the spindle inserting into the spindle receiving aperture 12 in the handle) the handle 10 is first rotated to the angular position that it needs to be in when the tap is fully off. In the example in FIG. 8, this is the orientation where the small protuberance 15 on the handle points to the tap's "9 o'clock" position (FIG. 8(i)). Also, in the particular tap assembly embodiment presently being described, the correct position for the handle 10 to be installed on the spindle 42 is (and it always will be, even if the in use position of the base ring 20 is different to that shown in FIG. 8) the orientation whereby the outer circular perimeter of the handle is perfectly aligned with the outer circular perimeter edge of the base ring 20 (which is of the same diameter as the circular handle). In any case, once the handle 10 has been turned to the correct relative orientation for installation, it can then be slid onto the cartridge spindle 42 (in this correct orientation), and the grub screw 16 can thereafter be inserted (etc, as described above) to secure the handle 10 to the spindle 42.

Once the overall tap assembly has been put together and installed for use (including being "plumbed in", etc), when the handle 10 is grasped by a user and turned, this causes the spindle 42 of the cartridge 40 to turn as well. This was explained above. And it will also be appreciated that when the tap assembly is fully installed and "plumbed in", turning the handle 10 (which turns the cartridge spindle 42) will cause water to flow through the tap, and further turning of the handle will cause the temperature of the water to increase, that is, in the manner described for progressive mixer taps in the Background section above.

At this point it is important to focus on the fact that, when the spindle 42 rotates (as a result of a user turning the handle 10), it does so (i.e. the spindle rotates) about its own central/principal longitudinal axis. Therefore, it follows that when the handle 10 is turned, the handle 10 also rotates about the central/principal longitudinal axis of the spindle 42 (which is also the principal axis of the spindle receiving aperture 12 when the handle and the spindle are connected). The handle does not, therefore, rotate about the axis extending through the centre (i.e. through the "centroid") of the handle's overall circular shape.

Importantly, because the handle 10 rotates about the central/principal axis of the cartridge spindle 42, not about the handle's own overall central axis, it follows by virtue of the geometry that when the handle 10 is turned by the user, not only does the handle 10 rotate in the direction in which the user is twisting, but it also "translates" or moves laterally in a plane perpendicular to those just-mentioned longitudinal axes.

Now, as has been alluded to in passing, in the particular embodiment described and shown in FIG. 4 to FIG. 8, there are a number of (albeit fairly subtle) temperature indication markings provided on the base ring 20. These temperature indication markings consist of a cold indicator marking "C", a moderate/warm indicator marking "°" and a hot indicator marking "H". These temperature indication markings are provided on the upper surface of the base ring 20, on the "wide" side thereof. (Basically, raised portion 22 is offset from the centre of the circular base ring 20, meaning that the raised portion 22 is somewhat over to one side, and the temperature indication markings are on the opposite side from this, spaced around on the upper surface of the base ring close to the perimeter edge.)

Importantly, when the tap handle 10 is in the "off" position as shown in FIG. 8(i) (provided the assembly has been put together and installed correctly, as described above), the handle 10 is actually located perfectly concentrically with and on top of the base ring 20. Consequently, when the tap is in the "off" position, the upper surface of the base ring 20, including the temperature indication markings thereon, is completely hidden and concealed by the handle 10 (which is directly on top). However, as just described above, when the handle 10 is turned by the user, not only does it rotate in the direction in which the user is twisting, but it also "translates" or moves laterally in a plane perpendicular to the axis of its rotation. Furthermore, with continued turning of the handle 10 (i.e. by the user), the handle 10 also continues to "translate" or move relative to its original "off" position. And as the handle 10 progressively translates or moves with further turning by the user (at least within the handle's range of motion, which is defined by the range of motion of the spindle 42), the upper surface of the base ring 20 (which was originally completely covered by the tap handle 10 in the "off" position) becomes more and more revealed. This is clearly illustrated in FIG. 8(i)-(vii).

Figure 8:
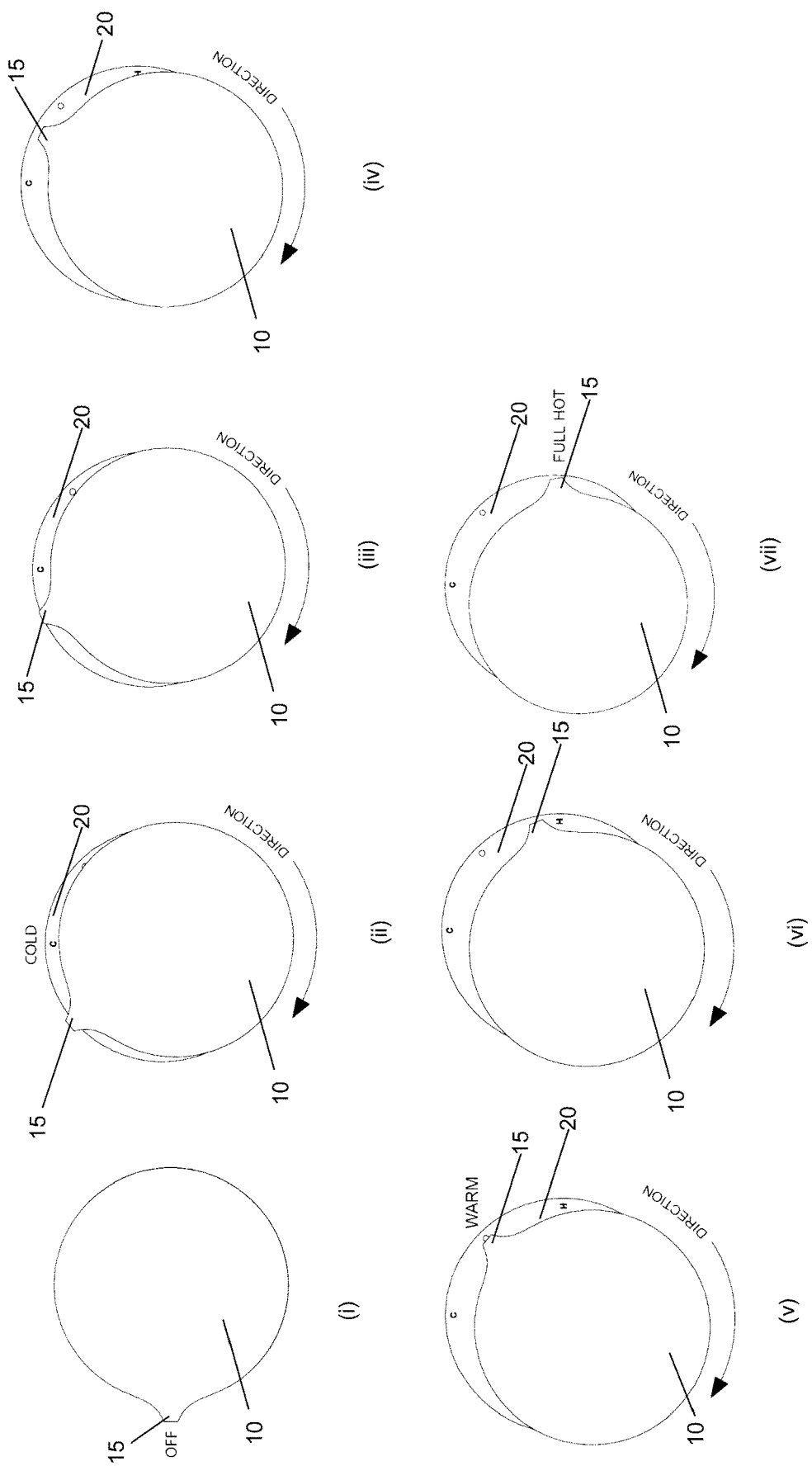
FIG. 8 illustrates the way that, in the particular progressive mixer tap embodiment depicted in FIG. 4 to FIG. 7, when the tap's handle is turned, the tap handle also translates, thereby allowing the indication markings (in this case temperature indication markings), which are hidden from view by the handle when the tap is off, to be revealed.

The purpose of the protuberance 15 on the handle 10 can also be clearly understood from FIG. 8(i)-(vii). The protuberance 15 effectively functions as a "pointer". Therefore, as a user begins to turn the handle 10 initially from the "off" position, the protuberance 15 will effectively begin to rotate around (clockwise in FIG. 8), and as explained above, as the handle 10 is turned, the upper surface of the base ring 20 will become progressively more revealed. After the handle 10 has been turned by an initial ~45° from the "off" position, the upper surface of the base ring 20 will have been revealed enough for the cold indication marking "C" to be visible. Thus, the user will understand that they can cause water to exit the water outlet at "full cold" temperature by turning the tap far enough that the protuberance 15 aligns with (in this case it covers) the cold water indication marking "C". At that point, water will begin (or it will be) exiting the water outlet at "full cold" temperature. In a similar way, as the handle is turned further, more of the upper surface of the base ring 20 will become revealed, including thereby revealing the warm/moderate indication marking "°". Thus, the user will then understand that they can cause the temperature of the water exiting the water outlet to become warmer by turning the handle such that the protuberance 15 moves towards or past the warm/moderate indication marking "°". And of course, as the handle is turned yet further still, even more of the upper surface of the base ring 20 will become revealed, including finally revealing the hot water indication markings "H", whereupon the user will know that they can cause the temperature of the water exiting the water outlet to be "full hot" by turning the handle to align the protuberance 15 with the hot water indication marking "H". And the same applies in reverse.

The aesthetic significance of this functionality provided by the present invention, as exemplified by way of example above with reference to FIG. 8, should not be underestimated. Of particular importance is the fact that, the tap does still provide temperature indication markings, which are important to enable the user to know how far to turn the tap in order to achieve the desired temperature, etc; however the invention also provides the benefit that (as just exemplified by way of example) when the tap handle 10 is in the "off" position, these temperature indication markings are hidden and therefore do not hinder or detract from the overall visual aesthetic or design appearance or overall colour scheme of e.g. the sink or basin or shower or bathroom where the progressive mixer tap is to be located and used. And in addition to this, even leaving aside the benefits provided by initially hiding, and then revealing as necessary, temperature indication markings, the actual way in which the handle "moves" (i.e. by not only rotating but also translating as the handle is turned) is also completely unlike the function provided by traditional tap handles (which only turn and don't translate), and this is also significant and (it is thought) highly desirable from the point of view of functional aesthetics.

A further possibility, which may also help to improve anaesthetics, is that the base ring may fit into (will be located within) a slight recess or depression in the countertop (or in the wall, etc) such that the surface on the base ring that has the temperature indications thereon may sit substantially flush with the surrounding countertop (or wall) surface, rather than protruding proud of said service or being recessed somewhat into said surface.

There is also another point that ought to be noted. In the particular embodiment depicted in FIG. 4 to FIG. 8, the planform shape of the handle 10 is circular. Therefore, when the tap is initially "fully off", and when the (circular) handle 10 (then in the off position) is first seen by the user, the user would automatically (if subconsciously or unknowingly) recognise that the centroid of the handle's (circular) planform shape is located at the geometric centre of that circular shape. And furthermore, because taps have traditionally always rotated about the geometric centre or centroid of the tap's planform shape, therefore the user in this case would expect that when they grasp the handle 10 and turn it, that the handle 10 would rotate about that geometric centre of the handle's circular shape. However, as explained above, this is not what happens. Rather, the handle 10 rotates, not about the handle's own geometric centre, but rather about an axis which is offset therefrom, and consequently the handle also translates or moves as it is turned. This will be unexpected or surprising or unusual to the user, and this may be a significant part of what gives the tap functional aesthetic appeal. Importantly, the same surprising/unusual (and therefore functionally aesthetically appealing) result would be achieved for a range of other non-circular tap handle shapes, especially shapes which are symmetrical in multiple directions and/or shapes for which the overall centroid is in an obvious geometric centre of the shape.

Figure 9:
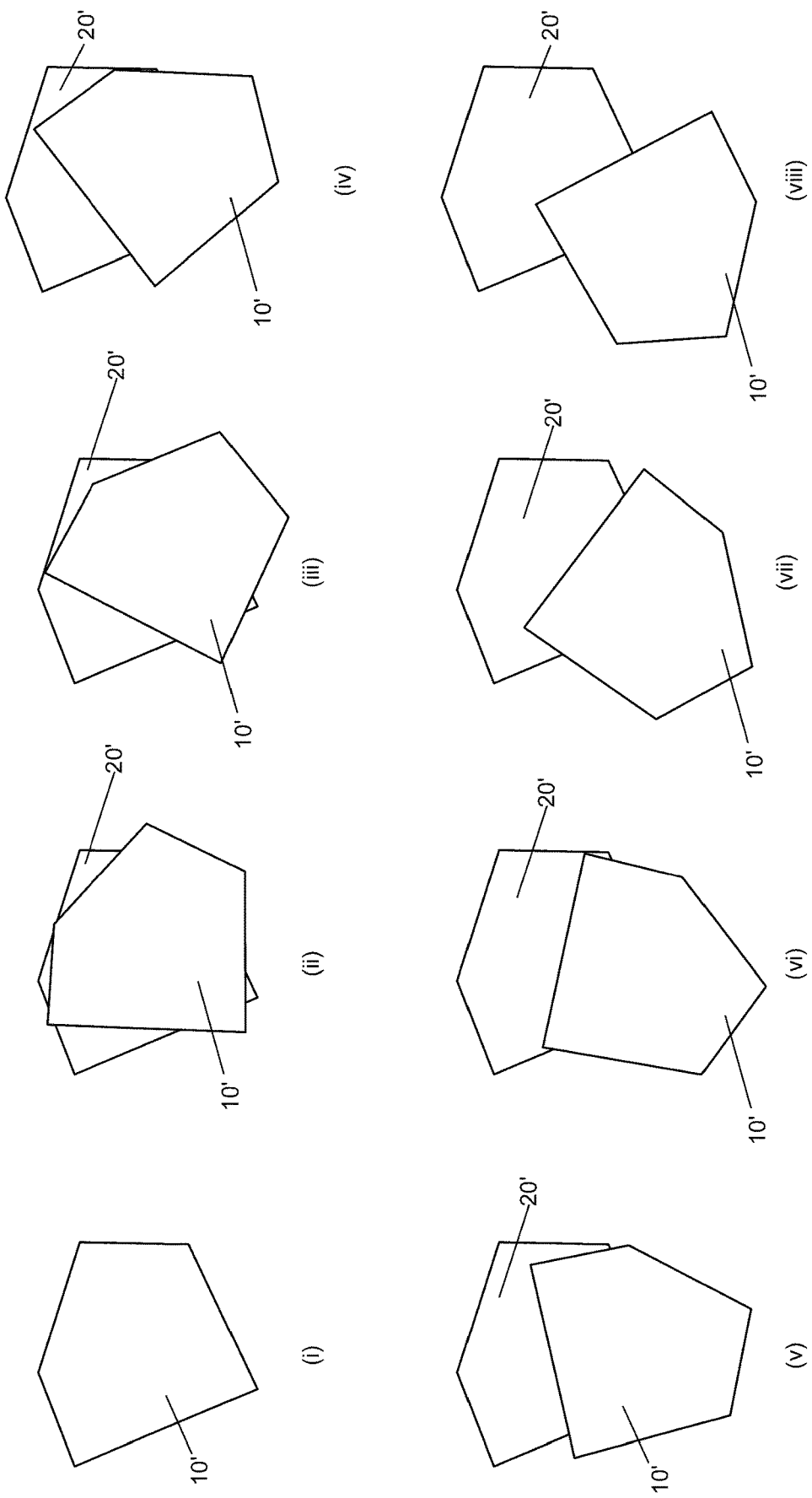
FIG. 9 illustrates the way that, when the invention is applied to a tap whose handle is a different shape to the tap handle in FIG. 4 to FIG. 8 (in FIG. 9 tap handle has a non-circular and non-symmetrical shape), even so, again, when the tap's handle is turned, the tap handle rotates and also translates.

Also, whilst the explanations in this Detailed Description section have been given primarily with reference to the embodiment depicted in FIG. 4 to FIG. 8 wherein the overall shape of the handle 10 is round/circular, it is to be clearly understood that the functionality and benefits provided by the present invention could equally be achieved with handles of any other shape (including non-symmetrical shapes). FIG. 9 is provided in order to illustrate this point.

In FIG. 9, the more the oddly shaped handle 10' is turned, the more of the similarly/identically oddly shaped plate 20' underneath is revealed, or at least different portions of the plate 20' are revealed. Therefore, for example, some form of graduated or coloured indication could be provided on the upper surface of the plate 20' whereby the user can see and understand that as different portions of the plate 20' become revealed, or as a greater amount/proportion of the plate 20' becomes revealed/visible, the more the temperature of the water exiting the water outlet increases, and vice versa.

In the particular embodiment depicted in FIG. 4 to FIG. 8, the handle 10 is substantially solid and opaque. Consequently, the surface beneath the handle 10 (in this case this is the surface of the base ring 20 on which the temperature indications are provided) is completely hidden when the handle is "fully off". However, this need not always be the case. Alternative embodiments may also be possible where the handle incorporates, say, an opening, or a transparent "window" or portion, or the like, such that certain parts or portions of the surface underneath the handle may be seen even when the handle is "fully off". However, even in these possible alternative embodiments, the surface parts or portions (etc) underneath the handle that are visible to the user will change as the handle is turned.

A further point that is to be clearly understood is that, whilst most of the explanations provided in the Detailed Description section have related to the particular embodiment in FIG. 4 to FIG. 8 where the tap is a progressive mixer tap, the invention is not limited to progressive mixer taps. Therefore, for example, the embodiment depicted in FIG. 4 to FIG. 8 could potentially be altered such that the progressive mixer cartridge 40 is replaced by the simple poppet valve assembly of a conventional hot or cold water tap (such valve assemblies typically include a spindle which can be rotated one way to raise, and the other way to lower, a poppet valve relative to a valve seat, etc). In that case, the tap would be a simple hot water tap or cold water tap. Even so, the functionality and benefits provided by the invention could still apply even in this simple case. For example, in this alternative case, the temperature indication markings on the upper surface of the base ring 20 could be replaced by flow rate indication markings. In this way, even though the tap only operates to control the flow of one or other of hot water or cold water, nevertheless the flowrate indication markings (which allow the user to know e.g. how far the tap currently is between "no flow" and "full flow") are still completely hidden when the tap is not in use and therefore do not hinder or detract from the overall intended visual aesthetic or design appearance or "feel".

Furthermore, even though it is envisaged that the present invention will be applied to taps which are used to control the flow of water (i.e. water taps), the invention is not necessarily limited to this. That is, the invention is potentially also applicable to taps which are used to control the flow of other forms of liquids or fluids (including gases), such that the invention could potentially even be used on, for example, a handle/dial used to control gas flow in an individual gas burner on a gas cooktop or barbecue. And in fact, the invention is potentially even applicable to other forms of dials which do not control or regulate the flow of fluids at all. For instance, the invention could potentially even be used to operate control dials, knobs or the like on electrical appliance such as electric ovens, electric cooktops/stovetops, fans, heaters, etc. In all of these kind of things, at least one turnable dial or handle or knob is typically provided to allow the user to control or regulate the operation of the device in question in some way—i.e. there is a dial or the like that can be turned by the user to allow the device (or the relevant section or part or element of the device) to be turned more on or more off, or to change its more or manner of operation, etc. And in all of these cases, the portion of the dial handle which the user grasps in order to turn it is in turn connected to a rotatable spindle or shaft or the like which in turn connects to the internal functional workings that control the operation of the device. And just like for bathrooms and sinks and the like discussed above, the visual appearance and ascetics of these other kinds of devices is also hugely important to their overall appeal, and therefore these things could potentially benefit in much the same way from the aesthetic, and functional aesthetic, improvements provided by the invention, as has been described above in the context of sinks and bathrooms and the like.

In the present specification and claims (if any), the word 'comprising' and its derivatives including 'comprises' and 'comprise' include each of the stated integers but does not exclude the inclusion of one or more further integers.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A tap assembly including:
   a flow control mechanism,
   a spindle associated with the flow control mechanism and which is operable in use to rotate about a principal axis of the spindle in order to thereby operate the flow control mechanism, and
   a handle which is connected to, or operable to be connected to, the spindle, such that, in use, a user can turn the handle by hand to thereby rotate the spindle, wherein
   the location on the handle where the spindle connects to the handle does not coincide with the centroid of the handle's planform shape, and consequently when the handle is turned by a user in use, the handle rotates about the spindle's principal axis and the handle also moves or translates relative to the spindle's principal axis
   wherein the handle is turnable between two extremes of rotation, an initial position and a final position, wherein an amount of rotation between these two extremes is less than 360°, and when the handle is in the initial position there is an area, or portion of a surface, which is obscured from a user's view by the handle, but when the handle is initially turned from the initial position towards the final position, the area or portion of the surface begins to be revealed, and with further rotation of the handle towards the final position, more of, or different parts of, said area or portion of the surface become revealed,
wherein said area or portion of the surface includes one or more temperature indication markings,
and wherein the handle includes a protuberance configured to point to the area or portion of the surface to indicate a temperature of water to be dispensed from the tap assembly.

2. The tap assembly as claimed in claim 1, wherein the amount of rotation between the two extremes of rotation is approximately 180° or less.

3. The tap assembly as claimed in claim 1 wherein, when the handle is connected to the spindle and the tap assembly is installed for use, and when the handle is in the initial position, the perimeter of the area or surface portion, which is then obscured from the user's view, is aligned with the perimeter of the planform shape of the handle, and the handle is positioned against or close to the said-area or portion of the surface such that the user is unable to see the obscured area or surface portion.

4. The tap assembly as claimed in claim 1 wherein, the said-area or surface portion, which is obscured from a user's view by the handle when the handle is in the initial position, is provided as a separate "hide-reveal" component which can be assembled together with other parts of the tap assembly.

5. The tap assembly as claimed in claim 4 wherein the tap assembly is configured such that, in assembling and installing the tap assembly:
  (a) the hide-reveal component is positioned and oriented, and then secured, in the position and orientation it is to have in use; and
  (b) subsequent to (a) the spindle associated with the flow control mechanism can be turned to the initial position; and
  (c) subsequent to (b), the handle can be oriented in the initial position and orientation and then connected to the spindle in this orientation.

6. The tap assembly as claimed in claim 1 wherein the flow control mechanism is a valve for a hot water tap or a cold water tap.

7. The tap assembly as claimed in claim 6, wherein the spindle is part of the valve and extends from a portion of the valve, although the spindle is also a rotatable relative to other parts of the valve, and the tap assembly also includes a housing inside which at least a portion of the valve is received and housed when the tap assembly is assembled and installed for use.

8. The tap assembly as claimed in claim 7, wherein the tap assembly further includes a means for securing the valve within the housing, such that, when the tap assembly is assembled and installed for use, the valve is substantially immovable relative to the housing, albeit the spindle is still rotatable about the principal axis relative to other pairs of the valve/cartridge.

9. The tap assembly as claimed in claim 8 wherein the flow control mechanism is a progressive mixer tap cartridge, the spindle is part of the cartridge and extends from a portion of the cartridge, although the spindle is also a rotatable relative to other parts of the cartridge, and at least a portion of the cartridge is received and housed in the housing when the tap assembly is assembled and installed for use, and, wherein the means for securing the cartridge within the housing includes a lock nut which is operable such that, after the cartridge has been correctly positioned within the housing, the lock nut can be screwed into the housing to secure the cartridge in position.

10. The tap assembly as claimed in claim 7, wherein the tap assembly is operable to be installed in a surface structure, and when the tap assembly is installed in the surface structure, a portion of the housing protrudes from a first side of the surface structure and a portion of the housing also protrudes from an opposite second side of the surface structure, and the tap assembly further includes at least one securing member operable to be connected to the housing on the first side of the surface structure and at least one securing member operable to be connected to the housing on the opposite second side of the surface structure, wherein, when so connected to the housing, the securing members are further operable such that the securing members engage with the surface on the first side of the surface structure and with the surface on the opposite second side of the surface structure and secure the housing relative to the surface structure.

11. The tap assembly as claimed in claim 1, wherein the flow control mechanism is a mixer cartridge for a mixer tap.

12. The tap assembly or a handle as claimed in claim 11, wherein the cartridge is a progressive mixer tap cartridge, the spindle is part of the cartridge and extends from a portion of the cartridge, although the spindle is also a rotatable relative to other parts of the cartridge, and the tap assembly also includes a housing inside which at least a portion of the cartridge is received and housed when the tap assembly is assembled and installed for use.

13. A handle for a tap assembly, wherein the tap assembly is a type that includes:
  a flow control mechanism, and
  a spindle associated with the now control mechanism and which is operable in use to rotate about a principal axis of the spindle in order to thereby operate the now control mechanism,
  and the handle is configured in such a way that:
  the handle is operable to be connected to the spindle such that, in use, a user can grasp the handle by hand and turn the handle to thereby rotate the spindle, and
  the location on the handle where the spindle connects to the handle coincides with the spindle's principal axis but does not coincide with the centroid of the handle's planform shape, and consequently when the handle is turned by a user in use, the handle rotates about the spindle's principal axis and the handle also moves or translates relative to the spindle's principal axis,
  wherein the handle is turnable between two extremes of rotation, namely an initial position and a final position, wherein an amount of rotation between these two extremes is less than 360°, and when the handle is in the initial position there is an area, or portion of a surface, which is obscured from a user's view by the handle, but when the handle is initially turned from the initial position towards the final position, the area or portion of the surface begins to be revealed, and with further rotation of the handle towards the final position, more of, or different parts of, said area or portion of the surface become revealed,
  wherein said area or portion of the surface includes one or more temperature indication markings,
  and wherein the handle includes a protuberance configured to point to the area or portion of the surface to indicate a temperature of water to be dispensed from the tap assembly.

14. An assembly including:
a housing which is:
- operable to receive a tap flow control mechanism that has a spindle which can rotate about a principal axis of the spindle to operate the flow control mechanism; and operable to be received and held in place in a surface structure in which the assembly is to be installed; and
- a tap handle which is operable to be connected to the spindle of the tap flow control mechanism such that, in use, a user can grasp the handle by band and turn it to thereby rotate the spindle, and wherein the location on the handle where the spindle connects to the handle coincides with the spindle's principal axis but does not coincide with the centroid of the handle's planform shape, and consequently when the handle is turned by a user in use, the handle rotates about the spindle's principal axis and the handle also moves or translates relative to the spindle's principal axis,
- wherein the handle is turnable between two extremes of rotation, namely an initial position and a final position, wherein an amount of rotation between these two extremes is less than 360°, and when the handle is in the initial position there is an area, or portion of a surface, which is obscured from a user's view by the handle, but when the handle is initially turned from the initial position towards the final position, the area or portion of the surface begins to be revealed, and with further rotation of the handle towards the final position, more of, or different parts of, said area or portion of the surface become revealed,
- wherein said area or portion of the surface portion includes one or more temperature indication markings,
- and wherein the handle includes a protuberance configured to point to the area or surface portion to indicate a temperature of water to be dispensed from the tap assembly.

* * * * *